No. 755,507. PATENTED MAR. 22, 1904.
W. LEMB.
BAKER'S OVEN.
APPLICATION FILED JULY 1, 1903.
NO MODEL. 2 SHEETS—SHEET 1.

WITNESSES
INVENTOR
William Lemb
BY
ATTORNEYS

No. 755,507. PATENTED MAR. 22, 1904.
W. LEMB.
BAKER'S OVEN.
APPLICATION FILED JULY 1, 1903.
NO MODEL. 2 SHEETS—SHEET 2.

WITNESSES:
INVENTOR
William Lemb
BY
ATTORNEYS

No. 755,507. Patented March 22, 1904.

UNITED STATES PATENT OFFICE.

WILLIAM LEMB, OF NEW YORK, N. Y.

BAKER'S OVEN.

SPECIFICATION forming part of Letters Patent No. 755,507, dated March 22, 1904.

Application filed July 1, 1903. Serial No. 163,889. (No model.)

*To all whom it may concern:*

Be it known that I, WILLIAM LEMB, a citizen of the United States, and a resident of the city of New York, borough of Brooklyn, in the county of Kings and State of New York, have invented new and useful Improvements in Bakers' Ovens, of which the following is a full, clear, and exact description.

This invention relates to improvements in stoves and furnaces, and has particular application to certain novel and useful improvements in bakers' ovens.

In carrying out the invention I have particularly in view the provision of means whereby the oven may be subjected to a continuous steady heat, thereby insuring a uniform baking; and a further object of my invention is to provide means whereby the dampers of the oven may be operated from a lintel situated at the front of the structure.

A further object of my invention is to provide a baking apparatus which shall embody the essential and desired features of simplicity, durability, and economy, the oven and the attachments therefor being also capable of installation at comparatively little expense.

With the above-recited objects and others of a similar nature in view my invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1:
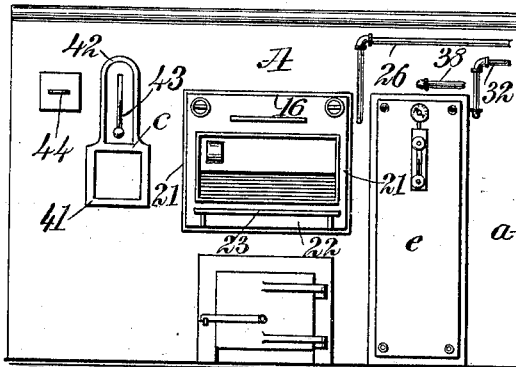
Figure 2:
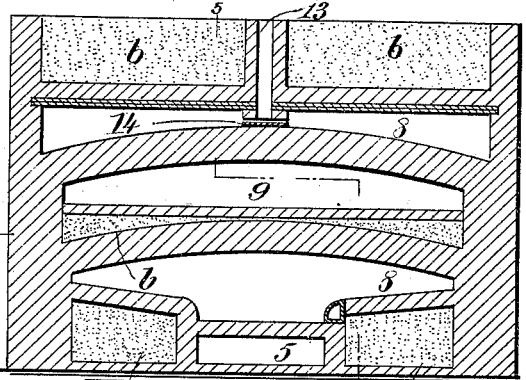
Figure 3:
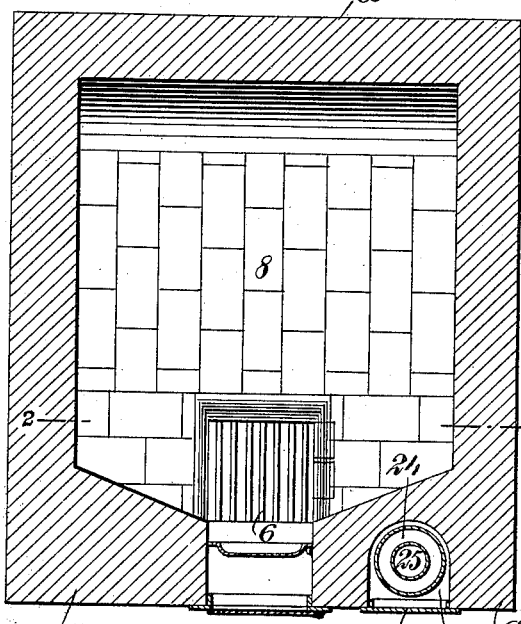
Figure 4:
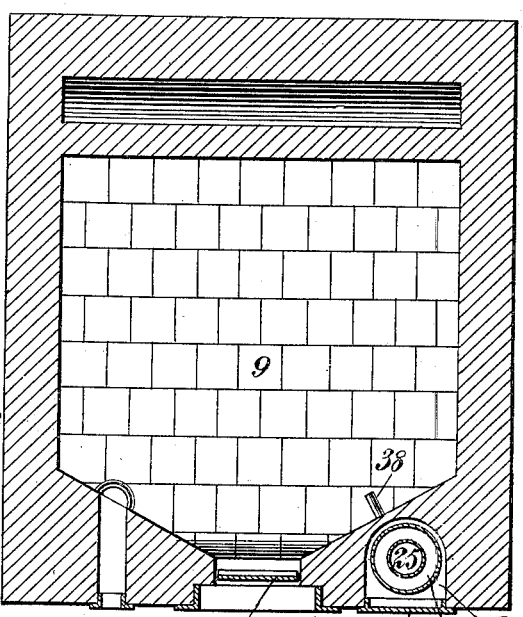
Figure 5:
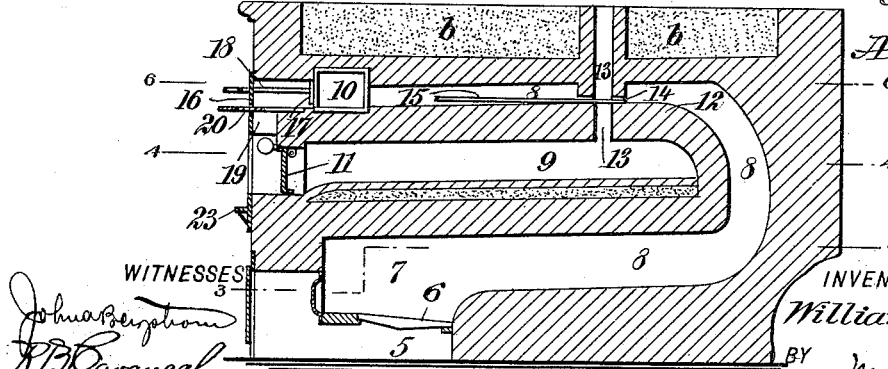
Figure 6:
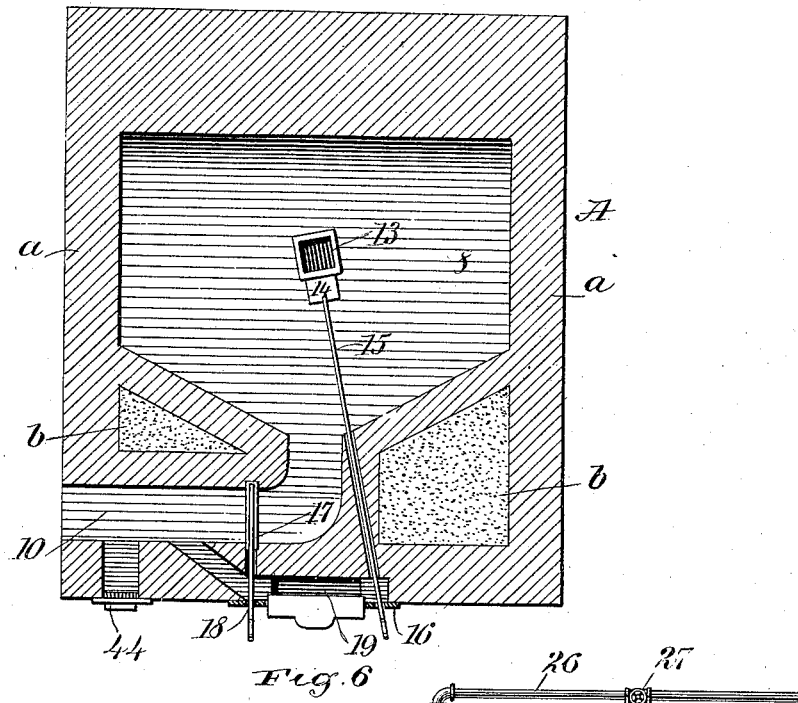
Figure 7:
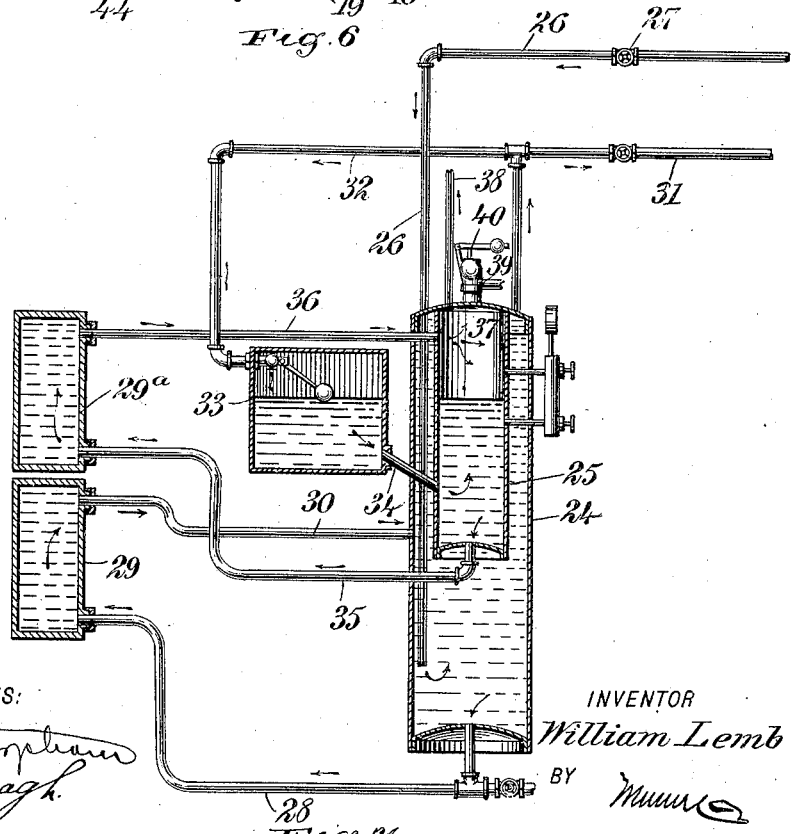

Figure 1 is a front view of an oven embodying my improvements. Fig. 2 is a transverse vertical sectional view taken on the line 2 2 of Fig. 3. Fig. 3 is a horizontal sectional view taken on the line 3 3 of Fig. 5. Fig. 4 is a similar view taken on the line 4 4 of Fig. 5. Fig. 5 is a vertical sectional view taken on the line 5 5 of Fig. 2. Fig. 6 is a horizontal sectional view taken on the line 6 6 of Fig. 5; and Fig. 7 is a view, partly in section, illustrating the system of boilers and piping for supplying water and steam to the oven.

Referring now to the accompanying drawings in detail, A designates the oven structure as a whole, the walls *a a* of the oven being composed of brick, cement, or any suitable material. Distributed through the various portions of the ovens is sand, (shown at *b*,) said sand being employed for the retention of the heat, while at the bottom of the oven is formed the usual ash-pit 5. Located above said ash-pit is a suitable grate 6, the space formed between the grate and the walls of the oven providing a fire-space 7. Leading from the fire-space 7 is a combustion-chamber 8, through which the products of combustion pass rearwardly around the back of the baking-chamber 9 and over the top of said chamber into the smoke-flue 10, which communicates with a chimney, (not shown,) it being observed that the combustion-chamber 8 is approximately U-shaped in vertical cross-section, as will be seen by reference to Fig. 5. The front of the baking-chamber 9 is closed through the medium of a suitable door 11, while in the rear central portion of the crown-wall 12 is formed a heat-regulating flue 13, controlled through the medium of a slide-damper 14, said damper being operated by a rod 15 passing through a lintel 16 at the front of the structure. The object in providing the flue 13 will be readily apparent, it being for the purpose of decreasing or lessening the heat in the baking-chamber 9—that is to say, should it be desirable to cool said chamber the door 11 may be open. The damper 14 is then drawn out and a current of cold air is allowed to pass directly through the baking-chamber 9. As the regulating-flue 13 has no communication with the combustion-flue 8 of the structure, the cooling of the baking-chamber, as above described, does not tend in any way to cool the fire or the smoke-flue 8, communicating with the fire-space 7, the construction being such that the cooling of the baking-chamber, as described, does not result in a waste of heat and fuel. The smoke-flue 10 is also controlled through the medium of a slide-damper 17, operated by a rod 18, passing through the lintel 16 from the front of the structure, said damper being ordinarily opened when the fire is started; but after the latter has been burning freely for some time the damper is closed to prevent the heat from passing into the chimney.

A vertical ventilating-flue 19 is formed at the front end of the oven, said flue being controlled through the medium of a slide-damper 20, operated in the lintel, the object of this ventilating-flue being to carry off all gas or steam which may escape from the baking-chamber 9 while opening the door 11 of the same, thus obviating the objection of having the gas pass into the bake shop or room, said flue 19 being also formed, preferably, independently of the smoke-flue of the structure. The lintel from which the three dampers are controlled is formed, preferably, of cast-iron or other metal, the front portion of the structure also having metallic corner-jambs 21 21, a sill 22, and a bracket or heel-rest 23, arranged beneath the door of the oven.

41 is a cast-iron or any other metal frame to receive a suitable oven-light.

42 is a suitable metal frame to receive an oven-thermometer 43, and 44 is a hand-hole for the purpose of removing soot which may collect or be deposited in the smoke-flue.

The above description has related mainly to the construction of the oven proper, and I will now proceed to describe in detail the arrangement of the steam and hot-water system used in conjunction with said oven. Arranged adjacent to the oven structure, and preferably seated in the cavity or niche $d$ in the wall of the oven and concealed from view by the plate $e$, is a suitable boiler 24, within which is nested a smaller supplemental boiler 25, cold water being supplied to the larger boiler through the medium of a pipe 26, having a suitable valve 27 arranged therein, the water passing into the boiler 24 and thence through a pipe 28 into the water-back 29 and thence through a pipe 30 back into the boiler 24, this being the ordinary way of connecting a kitchen-boiler. The hot water may then be drawn from the boiler to a sink or other receptacle through a pipe 31 or directed through a pipe 32 into a chamber or tank 33, such water then passing through a small pipe 34 into the small nested supplemental boiler 25. From this boiler the water passes through a pipe 35 into a water-back $29^a$ and back into the top of the supplemental boiler 25 through the medium of a pipe 36, said pipe entering the boiler above the water-line, and the steam into which the water has been converted is blown into a space 37, formed at the top of said boiler 25, it being understood that the water in the small boiler is always maintained at such a height that a space will be left therein for the reception of the steam coming through the pipe 36.

The steam from the boiler 25 may then be led into the baking-chamber 9 through a pipe 38, which pipe enters the oven at any suitable point. A waste-pipe 39 is connected to a safety-valve 40, which pipe may lead to a sewer, sink, or any other suitable place, and it will be further observed that the hot water in the boiler 24, surrounding the supplemental boiler 25, will tend to prevent the steam in the supplemental boiler from condensing.

From the above description, taken in connection with the drawings, the many advantages incident to my improved oven will be readily obvious, it being observed that the heat from the fire-box arranged beneath the oven may pass over and entirely around the same, while the self-regulating hot-water system provides the water for baking purposes and steam for the oven.

The many other advantages incident to my improved oven will be readily apparent, so that it is unnecessary to dwell upon the same here in detail.

Having thus described my invention, I claim as new and desire to secure by Letters Patent—

1. The combination in an oven, of a baking-chamber, a fire-box arranged beneath the baking-chamber, a passage-way for directing heat to the rear of and above the baking-chamber, a door arranged at the mouth of the baking-chamber, a vertical ventilating-flue arranged at the front of the oven and communicating with the upper mouth portion of the passage-way at a point outside the door of the baking-chamber, a damper for controlling said ventilating-flue, a smoke-flue for the oven, a damper for said smoke-flue, a regulating-flue connecting with the passage-way near the upper rear portion of the latter, and a damper for said regulating-flue.

2. The combination of an oven having a recess formed in the front wall thereof, a baking-chamber within said oven, a boiler located in the recess in the wall, means for leading steam from the boiler into the baking-chamber, a fire-box beneath the chamber, a passage-way extending from the fire-box, at a point below the baking-chamber around the latter to a point above the same, a heat-regulating flue communicating with the baking-chamber, a damper for controlling said flue, and a vertical ventilating-flue establishing communication between the upper mouth portion of the passage-way and the mouth of the baking-chamber.

3. The combination of an oven having a baking-chamber therein, means for supplying steam to the oven, a fire-box beneath the baking-chamber, a passage-way leading around the oven, for conducting the products of combustion from the fire-box, a vertical heat-regulating flue communicating with the upper portion of the baking-chamber, a smoke-flue communicating with the passage-way, a vertical ventilating-flue establishing communication between the mouth of the oven and the upper
5 mouth portion of the passage-way, and dampers for controlling the regulating-flue, the smoke-flue and the ventilating-flue.

In testimony whereof I have signed my name to this specification in the presence of two subscribing witnesses.

WILLIAM LEMB.

Witnesses:
   JOHN LEMB,
   RICHARD B. CAVANAGH.